July 30, 1946.  C. J. BLOM  2,404,783
SUBMERSIBLE MOTOR
Filed Aug. 1, 1944   3 Sheets-Sheet 1
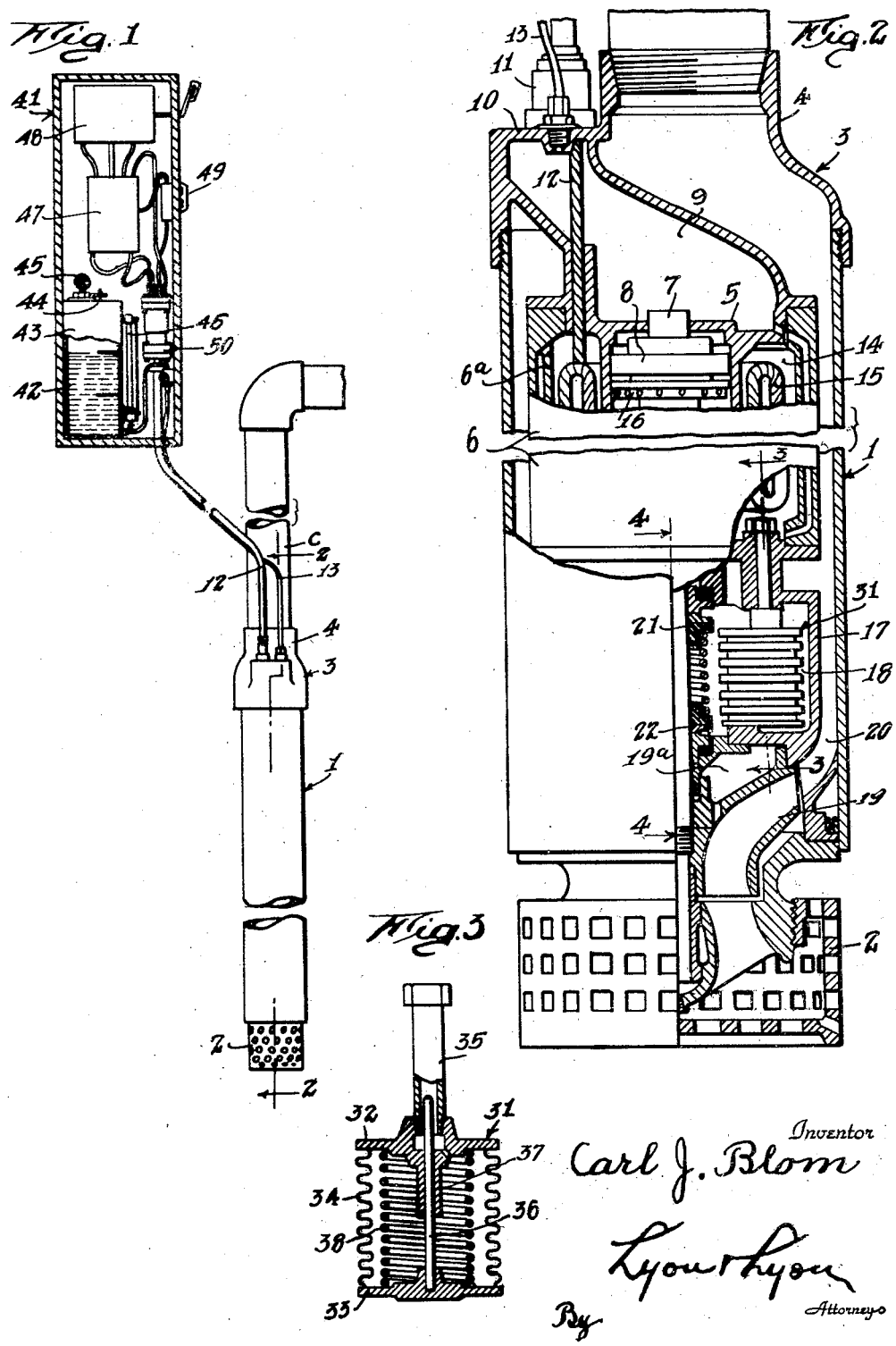
Inventor
Carl J. Blom
By Lyon Lyon
Attorneys

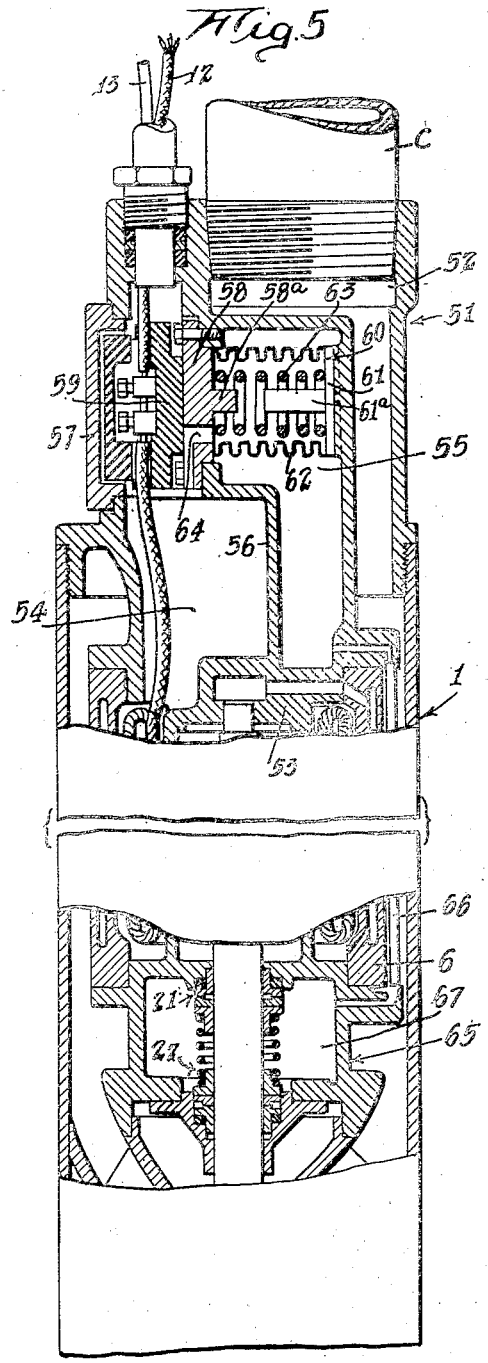
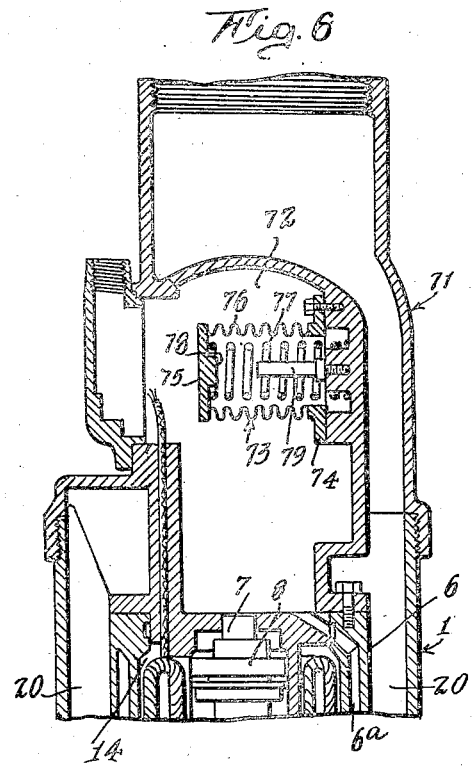
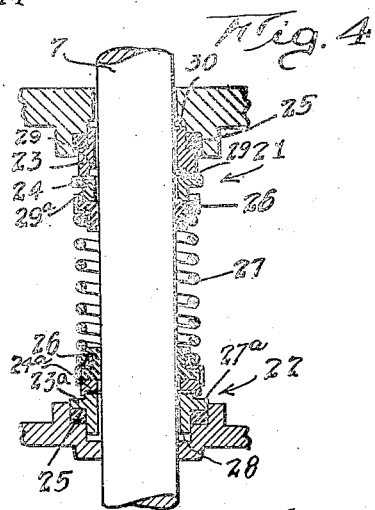

July 30, 1946. C. J. BLOM 2,404,783
SUBMERSIBLE MOTOR
Filed Aug. 1, 1944 3 Sheets-Sheet 3
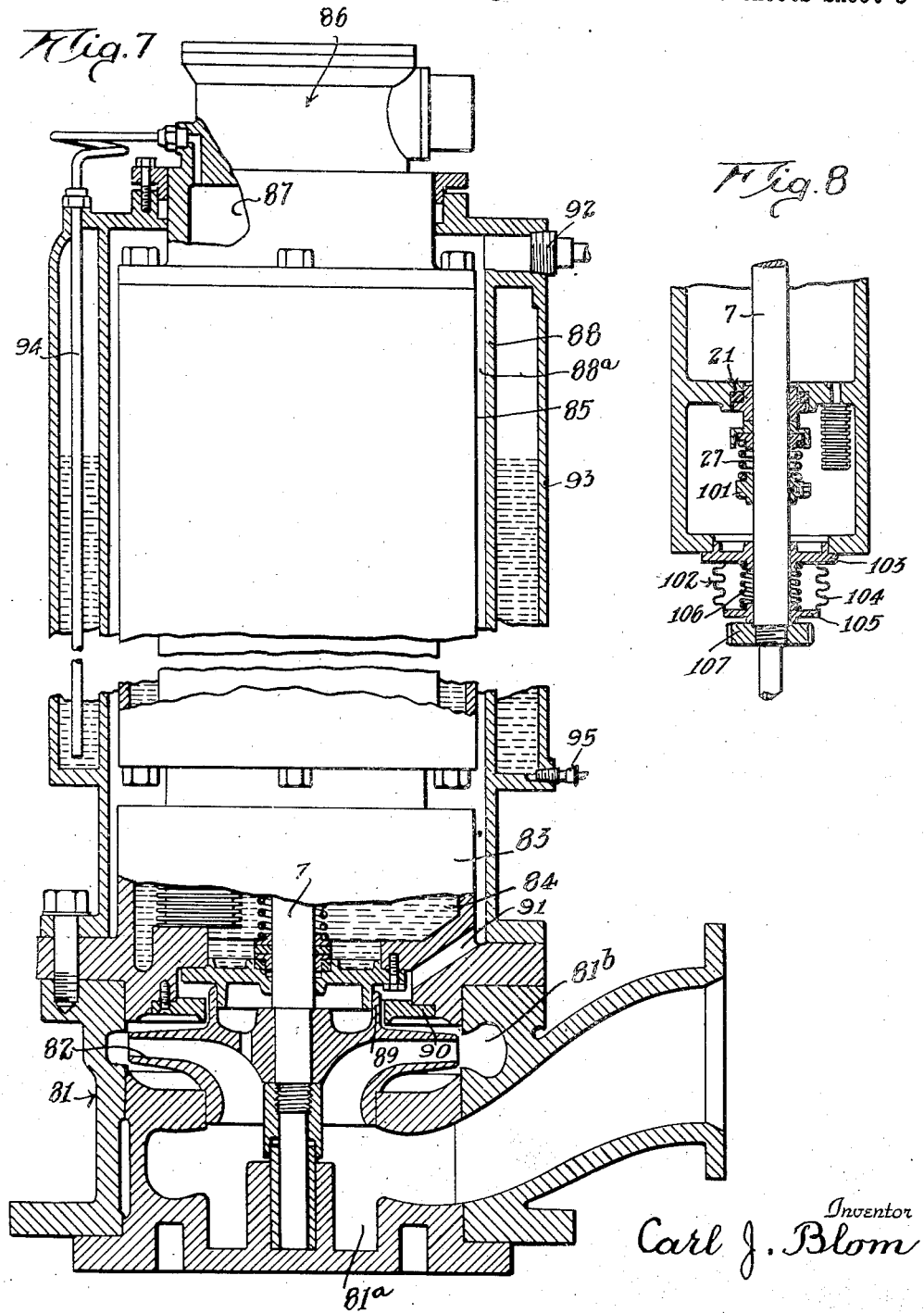

Patented July 30, 1946

2,404,783

UNITED STATES PATENT OFFICE 2,404,783

SUBMERSIBLE MOTOR

Carl J. Blom, San Marino, Calif., assignor to Byron Jackson Co., Vernon, Calif., a corporation of Delaware Application August 1, 1944, Serial No. 547,617

15 Claims. (Cl. 103—87)

This invention relates to submersible electric motors and more particularly to combined motor and pump units, although certain features of the present invention are useful on submersible motors which are used for purposes other than the operation of pumps.

The term "submersible," as used herein means that the motor is surrounded by a fluid, either liquid, gas or air, which is excluded from access to the interior of the motor.

The present invention relates to those types of submersible motors or motor pumps having means for maintaining a pressure inside the motor which is at all times equal to or higher than the submergence pressure. If the invention is applied to a motor-pump unit, the pressure inside the motor is preferably maintained as high or higher than the suction pressure and, if the discharge pressure is in communication with the motor shaft seal, the pressure in the motor is maintained as high or higher than the discharge pressure.

The present invention relates particularly to submersible electric motors of the type having a so-called "mechanical" seal, as distinguished from so-called "liquid" seals or common stuffing boxes. An example of a submersible motor having a mechanical seal (or common stuffing box) is shown in U. S. Patent No. 2,002,913, issued May 28, 1935, to Mendenhall and Van Horn. An example of a submersible electric motor having a liquid seal may be seen in U. S. Patent No. 2,002,- 914, issued May 28, 1935, to Mendenhall and Van Horn.

Liquid seals, as presently constructed, can be used only in a vertical position and consequently are not suitable for certain types of service, for example, in salvage type pumps which may have to operate in any position from vertical to horizontal. Nor are liquid seals suitable where there is a material pressure difference across the seal, since such a pressure would displace the liquid from the seal.

Mechanical seals may be of the single or double type. The present invention relates to the double type of seal. Double mechanical seals may have the two seals directly adjacent each other, as illustrated in Patent No. 2,002,913, or the two seals may be separated as shown in U. S. Patent No. 2,320,708, issued June 1, 1943, to Lloyd Yost.

Double mechanical seals not only provide double resistance to leakage but they also permit the use of a higher pressure for sealing than exists in the motor or pump.

The principal object of the present invention is to provide a submersible motor having an oil-filled motor compartment and a mechanically sealed oil-filled seal chamber, wherein means are provided to maintain substantially equal pressure between the motor compartment and seal chamber even though the fluid volume change in the seal chamber is substantial.

Another object is to provide an oil-filled submersible motor which is capable of continuous or intermittent operation over extremely long periods of time without contamination of the oil in the motor by the fluid being pumped.

Another object is to provide an oil-filled submersible motor and pump which is capable of operating dry for an appreciable interval, thereby providing a motor and pump which is particularly suitable for use as a bilge pump or similar use.

With the above and other objects in view as may appear hereinafter, reference is directed to the accompanying drawings, in which:

Fig. 1 is a substantially diagrammatical view of one form of submersible electric motor pump, wherein the oil in the motor is maintained under substantially constant air pressure;

Fig. 2 is an enlarged, fragmentary sectional view thereof through 2—2 of Fig. 1, showing one arrangement of pressure equalizing bellows and mechanical seal;

Fig. 3 is an enlarged fragmentary sectional view through 3—3 of Fig. 2, illustrating in detail the construction of the bellows employed;

Fig. 4 is an enlarged fragmentary sectional view through 4—4 of Fig. 2, illustrating the mechanical seal arrangement in detail;

Fig. 5 is a fragmentary longitudinal sectional view similar to Fig. 2, of a modified form of submersible electric motor pump particularly suitable for pumps of small diameter;

Fig. 6 is a fragmentary sectional view of the head structure only of another modified form of oil-filled submersible electric motor pump wherein a sealed air chamber within the motor compensates for changes in the volume of the oil;

Fig. 7 is another fragmentary longitudinal sectional view of a further modified form of submersible electric motor pump wherein only a small portion of the pumped fluid is employed to cool the motor, and an air pressure tank for maintaining pressure on the lubricant fluid is arranged in a jacket surrounding the motor;

Fig. 8 illustrates diagrammatically another arrangement of a seal chamber having double mechanical seals wherein sealing bellows are employed between the seal chamber and the exposed end of the shaft.

Reference is made first to the structure shown in Figs. 1, 2, 3 and 4. An outer shell 1 is fitted at its lower end with a pump intake structure 2 and is connected at its upper end to a head structure 3. The head structure includes a reducer fitting 4 for connection to a casing or pipe C. The head structure also includes a motor head 5 located within the reducer fitting and adapted to suspend a motor case 6 within the outer shell 1. The motor head 5 journals a shaft 7 by an upper bearing 8. Above the upper bearing the motor head 5 forms an upper protective fluid chamber 9 isolated from the reducer fitting or shell 4. The protective fluid may be any fluid having, primarily, dielectric properties sufficient to prevent shorting of the motor windings; it may also have lubrication properties. Various oils, or oil-like fluids similar to "transformer" oil have been found suitable. Hence, for convenience, the protective fluid may be hereinafter referred to as "oil."

The upper end of the oil chamber 9 forms a shelf 10 located at one side of the smaller end of the reducer fitting. A terminal element 11 forming the end of a conductor cable 12 is fastened into the shelf 10 so that the conductor may be brought into the oil chamber and through the motor head into the motor case 6. An oil line 13 which may be incorporated in the conductor cable or constitute a separate line, is provided with a fitting for attachment to the shelf 10 so that the oil line communicates with the interior of the upper oil chamber 9.

A motor chamber 14 is provided within the motor case 6, and the elements of an electric motor including the field coils 15 and the armature (not shown) are arranged therein. An oil circulating pump 16 may be provided on the shaft 7 for the purpose of circulating oil in one direction through the motor chamber, and in the opposite direction through oil jacket 6a incorporated in the motor case 6.

The lower end of the motor case 6 is closed by a seal chamber housing 17 which defines a sealed chamber 18. The shaft 7 extends through the seal chamber and its protruding end is provided with a pump rotor 19 which draws fluid from the pump intake 2 and discharges it into a fluid passage 20 formed between the seal chamber housing 17, motor case 6, and outer shell 1.

It is preferred to arrange the pump rotor 19 in such a manner that a low pressure chamber 19a is provided between the pump rotor and the under side of the seal chamber housing 17.

A seal unit 21 is provided around the shaft 7 to isolate the seal chamber from the motor chamber. A similar seal unit 22 is provided around the shaft 7 to isolate the seal chamber from the low pressure chamber 19a and from the pumped fluid. The seal units comprise respectively fixed rings 23 and 23a secured to a wall of the seal chamber and rotating rings 24 and 24a mounted on the shaft 7 within the seal chamber as shown best in Figure 4.

The fixed seal rings 23 and 23a are preferably backed or seated on resilient rings 25 formed of rubber, synthetic rubber, leather or suitable material which are fitted in the wall of the seal chamber. The rotating rings are backed by flexible seal rings 26 of material similar to the resilient rings 25. The resilient rings 25 and the seal rings 26 form the double function of first, sealing the connections between the rings 23 and 23a and seal chamber walls and between the rings 24 and the shaft 7 respectively; and secondly, permitting limited wobble adjustment of the rings 23 and 24 to effect perfect mating between their confronting sealing surfaces.

A spring 27 is interposed between the seal rings 26 to urge the rotating rings 24 and 24a against their respective fixed rings 23 and 23a. The seal units 21 and 22 are, in effect, check valves which open from the motor chamber 14 and the low pressure chamber 19a respectively, into the seal chamber if the external pressure is high enough to overcome the force of the spring 27 and the pressure of the fluid in the seal chamber against the rings 24.

It is desirable that the upper seal unit 21 open at a lesser pressure differential than the lower one; furthermore, it is desirable that the fixed seal rings 23 and 23a have no special fastening means to hold them in place, but instead be held against their respective resilient rings 25 by fluid pressure. Both of these objectives are accomplished in the arrangement shown in Fig. 4.

The fixed seal ring 23 of the lower seal unit 22 is provided with a flange exposed to the seal chamber and which constitutes a pressure face 27a. The pressure face 27a is equal to or greater than the lower end 28 of the lower fixed seal ring 23a; consequently, pressure in the seal chamber urges this ring against its seat. The bore of the lower fixed seal ring 23a is substantially the same as its mating rotating ring so that there is no appreciable pressure area subject to pressure in the chamber 19a and effective to raise the rotating ring.

One of the confronting sealing surfaces of the fixed or rotating ring of the upper seal unit is undercut adjacent the shaft 7 to form confronting pressure faces 29 and 29a. The effective area of these pressure faces exceeds the area of the upper end 30 of the upper fixed seal ring 23 so that the pressure in the motor chamber 14 urges the upper fixed seal ring 23 into its seat. Furthermore, the pressure in the motor chamber is effective against the pressure face 29a of the rotating ring to urge this ring downwardly against the spring 27.

A pressure equalizing bellows 31 is provided in the seal chamber 18. As shown best in Fig. 3, the bellows 31 comprises a circular head member or plate 32, and a circular foot member or disc 33 connected by an annularly corrugated bellows shell 34. The head member 32 is suitably secured to a wall of the seal chamber housing 17 preferably at the upper wall, by means of a hollow bolt 35 which extends through the upper wall of the seal chamber housing into the motor chamber 14, so that oil or other dielectric liquid from the motor chamber may enter the bellows. The foot member 33 is provided with a stem 36 which is guided by a sleeve 37 depending from the head member 32. A spring 38 tends to expand the bellows so that normally the bellows occupies an extended position as shown in Fig. 2.

The conductor cable 12 and oil line 13 extend upwardly along the casing C and into a control unit 41. Within the control unit 41 is an oil reservoir 42 with which the oil line 13 communicates. The reservoir may be located at an elevation high enough above the motor so that the internal oil pressure in the motor will always exceed the submerged pressure, that is, the pressure at the pump rotor, particularly the low pressure chamber 19a, whether the motor is running or idle. This is not, however, always convenient, and where the elevation of the reservoir gives insufficient head on the oil in the motor, additional pressure may be provided. As shown in Fig. 1, this is accomplished by an air or gas compartment 43 in the reservoir 42 above the oil level. The air or gas pressure in compartment 43 may be built up by means of a compressor or by a hand-pump (not shown) through a check valve 44. The reservoir is preferably provided with a pressure gauge 45 and an oil level gauge 46. Also contained in the control cabinet for convenience, is a motor starter 47, a fuse-box 48, a starter switch 49, and the end fixture or terminal 50 for the cable 12.

By means of the reservoir 42 the pressure of the oil within the motor chamber 14 is maintained substantially constant at all times, whether the motor is running or idle and whether the oil is hot or cold. The seal chamber 18 does not have any means of escape, so that its pressure could not equalize were it not for the bellows 31. The crux of the present invention lies in the arrangement of the seal chamber housing 17, mechanical seal units 21 and 22, and the bellows 31 in association with the oil-filled motor and the pump or other device driven thereby. It should be pointed out that a submersible pump of the type herein illustrated, is more often than not located in a most inaccessible place. It is not convenient or feasible to inspect it frequently. Often it is employed to pump water, even salt water or contaminated material, a small quantity of which would, if it entered the motor, cause the motor to burn out. Thus the seal chamber must exclude such deleterious fluids from the motor under a wide range of conditions. It must exclude when the motor is idle, when it is running, when it is heating up, and when it is cooling. It must safeguard the motor under abnormal conditions, for example, when the pump runs dry, or under other conditions where excessive heating occurs.

The bellows functions principally during the warming up period of the motor. Initially the pressures in the motor chamber and the seal chamber are equal and exceed the hydrostatic head or discharge head, or the suction head of the pump, whichever pressure exists in the chamber 19a. During the warming up period, the pressure in the motor chamber does not rise because the heated and expanded dielectric fluid escapes either through the tube 13 or compresses the compensating bellows 73 in Fig. 6.

The dielectric fluid in the seal chamber as it heats, has no means of escape, for if it discharged into the motor chamber the utility of the seal chamber would be materially lessened. Instead, the expanding fluid in the seal chamber compresses the bellows to some intermediate position. The bellows may remain in such position during running of the motor, or may expand slightly should there be slight leakage out the lower seal unit 22 or 102. When the pump is stopped and the dielectric fluid cools, the bellows expands to its extended position. If any fluid from the seal chamber has seeped out, and the bellows expands to its full position before the fluid has reached its lowest temperature, the pressure in the seal chamber drops slightly below the motor chamber, causing additional fluid to enter through the upper seal unit 21, and compensate for the loss.

This function of the bellows in conjunction with mechanical seal units is of primary importance. It makes possible maintenance of the proper pressure between the sealing faces of the seal rings. If this pressure is too low, the seal is not effective; if too high, excessive wear and scoring take place. Any scoring of the seal faces is very detrimental, and hence it is of the utmost importance that the pressure between the seal faces be maintained at all times below a predetermined maximum.

In the constructions hereinafter described, the bellows and seal arrangement is essentially the same as that shown in Figs. 2, 3 and 4, but shown in association with different types of submersible motors.

Attention is now directed to Fig. 5. The construction herein shown is particularly adapted where the diameter of the submersible pump must be held to a minimum. In such cases where the diameter is limited, there is insufficient space in the seal chamber for the bellows. As in the first described arrangement, a head structure 51 is provided, which is secured to the outer shell 1. The head structure includes a reducer fitting 52 for connecting the outer shell 1 to a discharge pipe or casing. The head structure also includes a motor head 53 located within the reducer fitting 52, which is attached to the motor case 6. Above the motor head the head structure 51 is divided into an oil chamber 54 and bellows chamber 55 isolated from the pumped fluid passage through the reducer fitting. The oil chamber and bellows chamber are separated by a partition 56. Aligned laterally directed openings are provided in the partition 56 and opposite wall of the oil chamber 54. These openings are closed by cover plates 57 and 58. Between the cover plates, that is, in the oil chamber 54, is a terminal block 59 which affords a means of connecting the conductor cable 12 with the electric motor contained in the motor case.

Within the bellows chamber 55 is an equalizer bellows 60 which performs the same function as the equalizer bellows 31. The bellows 60 includes an end disc or member 61 which is connected with the cover plate 58 by an annularly corrugated bellows shell 62. Stops 58a and 61a extending from the cover plate 58 and end member 61, respectively, limit collapsing movement of the bellows. A spring 63 urges the bellows to its extended position. A port 64 communicates between the interior of the bellows and the oil chamber 54. The bellows chamber 55 communicates with a seal chamber housing 65 corresponding to the seal chamber housing 17 of Fig. 2, through an oil tube 66. The seal chamber housing 65 defines a seal chamber 67 which is similar to the seal chamber 18, but is by reason of space limitation, too small to accommodate the equalizer bellows. The mechanical seal units 21 and 22 may be identical or similar to those shown in the first described structure. Also, as in the first described structure, an oil line 13 communicates between a reservoir 42 and the oil chamber 54, so that the oil pressure in the oil chamber and motor chamber is maintained constant.

The construction shown in Fig. 6 is designed to eliminate the oil line 13. Only the head portion is shown as the seal chamber and associated parts may be identical with that shown in Fig. 2. In this construction a head structure 71 is provided which may be similar to the head structure 3 or 51, with the exception that an enlarged oil chamber 72 is substituted for the oil chamber 9 or 54, as the case may be. Within the enlarged oil chamber 72 is a volume compensating bellows 73, the interior of which is completely sealed and contains air or gas at atmospheric pressure or at some predetermined higher pressure. The bellows includes a base ring 74 attached to a wall of the oil chamber 72 in sealing relation therewith, a foot disc 76 and an annularly corrugated bellows shell 76 connecting the base ring and foot disc. A spring 77 urges the bellows to its extended position, and stops 78 and 79 limit collapsing movement of the bellows. The spring and the internal pressure of the gas sealed in the bellows 73, is such that a predetermined pressure can be maintained in the motor chamber and oil chamber. As the oil expands due to heating, the bellows 73 compresses to compensate for the increased volume of oil.

Reference is now directed to the construction shown in Fig. 7. As has been pointed out hereinbefore, the submersible motor herein contemplated, is a motor which is surrounded by fluid either liquid, gas or air, which fluid is excluded from access to the interior of the motor. Thus while in the previously described structures, the motor is actually immersed in the liquid being pumped, the construction shown in Fig. 7 is directed to a motor which is not immersed in the pumped liquid except insofar as a portion of such liquid is used as a cooling medium flowing in a jacket surrounding the motor.

In the construction shown in Fig. 7, a pump housing 81 is provided in which is mounted a pump impeller 82. The pump housing defines an intake chamber 81a communicating with the intake side of the impeller 82, and a discharge chamber or volute 81b adapted to receive the pumped fluid from the impeller. The impeller is mounted on the shaft 7 as in the first described structure. The pump housing 81 supports a seal chamber housing 83 which defines a seal chamber 84 similar to the seal chamber 18. A motor housing or case 85 is mounted on the seal chamber housing 83, and contains a motor structure which may be similar to that shown in Fig. 2. A motor head 86 is provided, which defines an oil chamber 87. An outer shell 88 jackets the motor housing and seal chamber housing, and forms therewith an annular space 88a for the circulation of a portion of the pumped fluid for cooling the motor.

The pumped fluid used to cool the motor is obtained from the discharge chamber 81b. The upper side of the impeller 82 is provided with an upwardly directed rim 89. An orifice ring 90 secured to the under side of the seal chamber housing 83 defines with the rim 89 an annular orifice which communicates with the space 88a formed within the shell 88 through inlet passages 91. The upper end of the shell 88 is provided with an outlet 92.

The shell 88 is surrounded by an oil jacket 93. An oil pipe 94 communicates between the bottom of the oil jacket and the motor head 86. The oil jacket is equipped with an air supply valve 95 for the purpose of introducing air under pressure. The jacket is, of course, provided with a suitable liquid level gauge and pressure gauge (not shown). The oil jacket has a relatively large volume so that the liquid level can raise and lower as the oil within the motor is heated or cooled without appreciably changing the pressure. This pressure is, of course, maintained higher than at least the intake or suction pressure of the pump.

In the various constructions heretofore described, the mechanical seal units 21 and 22 have been shown. Certain modifications of the mechanical seal units are possible, and one is indicated diagrammatically in Fig. 8.

In the construction shown in Fig. 8, the upper seal unit 21 is the same as that previously described. The spring 27, however, bears against a collar 101 on the shaft 7 instead of the lower seal unit. The lower seal unit, in this case designated 102, is mounted below the seal chamber. The seal chamber is provided with an adapter ring 103 surrounding the shaft 7. A bellows 104 depends from the adapter ring 103 and is closed at its lower end by a "fixed" that is, non-rotating ring 105. The non-rotating ring is urged downwardly by a spring 106 and fluid pressure in the seal chamber. A rotating ring 107 is attached to the shaft 7 and is engaged by the non-rotating ring.

Many other embodiments of the invention may be resorted to without departing from the spirit of the invention.

I claim:

1. An electric motor driven pump structure comprising: a motor chamber and a seal chamber at one end thereof, said chambers adapted to contain a dielectric liquid, a motor in said motor chamber, a shaft extending from said motor through said seal chamber to the exterior thereof, a pump impeller on the extended end of said shaft, mechanical seal units surrounding said shaft to isolate said seal chamber from liquid transfer along said shaft from the exterior or from said motor chamber, and a flexible partition having one side exposed to said motor chamber and its other side exposed to said seal chamber to compensate for changes in volume of the liquid in the seal chamber.

2. An electric motor driven pump structure comprising: a motor chamber and a seal chamber at one end thereof, said chambers adapted to contain a dielectric liquid, a motor in said motor chamber, a shaft extending from said motor through said seal chamber to the exterior thereof, a pump impeller on the extended end of said shaft, mechanical seal units surrounding said shaft to isolate said seal chamber from liquid transfer along said shaft from the exterior or from said motor chamber, means for subjecting the liquid in said motor chamber to a pressure at least equal to the external pressure exerted against said seal chamber at the region of emergence of said shaft, and a flexible partition having one side exposed to said motor chamber and its other side exposed to said seal chamber to compensate for changes in volume of the liquid in the seal chamber.

3. An electric motor-driven pump comprising: a liquid filled motor chamber, a liquid filled seal chamber and having an inner wall closing an end of said motor chamber and an outer wall exposed to the pumped fluid, a motor in said motor chamber having an impeller shaft extending through the inner and outer walls of said seal chamber, sealing means between said shaft and the inner and outer walls of said seal chamber to isolate said seal chamber from said motor chamber and from the pumped fluid, and a flexible partition having one side exposed to said motor chamber and its other side exposed to said seal chamber to compensate for changes in volume of the liquid in said seal chamber.

4. A construction as set forth in claim 1, wherein each sealing means includes a fixed ring restrained against rotation and a rotating ring mounted on said shaft, said rings having mating surfaces forming a fluid-tight seal therebetween.

5. A construction as set forth in claim 2, wherein each sealing means includes a fixed ring restrained against rotation and a rotating ring slidably mounted on said shaft in sealed relation therewith, said rotating ring being within said seal chamber and urged by the fluid pressure therein against said fixed ring, said rings having mating surfaces forming a fluid-tight seal therebetween.

6. A construction as set forth in claim 1, wherein each sealing means includes a fixed ring restrained against rotation by seating engagement in a wall of said seal chamber, a rotating ring on said shaft within said seal chamber, and a spring urging said rotating ring against said fixed ring, said rings having mating surfaces forming a fluid-tight seal therebetween.

7. A construction as set forth in claim 2, wherein each sealing means includes a fixed ring restrained against rotation by seating engagement in a wall of said seal chamber, a rotating ring on said shaft within said seal chamber, and a spring urging said rotating ring against said fixed ring, said rings having mating surfaces forming a fluid-tight seal therebetween.

8. In an electric motor driven pump structure wherein the electric motor is encased in a fluid-tight case and the motor shaft protrudes from said case for connection to a pump impeller, the combination of: a seal chamber interposed between the motor case and the impeller; double mechanical seal elements surrounding said shaft and isolating said seal chamber from said motor case and from the region of said impeller; and a flexible partition having one side exposed to the interior of said motor case and its other side exposed to said seal chamber, and adapted to compensate for change in the volume of a liquid filling said seal chamber.

9. In an electric motor driven pump structure wherein the electric motor is encased in a fluid-tight case and the motor shaft protrudes from said case for connection to a pump impeller, the combination of: a seal chamber interposed between the motor case and the impeller, double mechanical seal elements surrounding said shaft and isolating said seal chamber from said motor case and from the region of said impeller, a flexible partition having one side exposed to the interior of said motor case and its other side exposed to said seal chamber and adapted to compensate for change in the volume of a dielectric liquid filling said seal chamber, said motor case likewise filled with said liquid; and means for maintaining the liquid in said motor case above the pressure externally of said seal chamber in the region of said shaft.

10. In an electric motor driven pump structure wherein the electric motor is encased in a fluid-tight case and the motor shaft protrudes from said case for connection to a pump impeller, the combination of: a seal chamber interposed between the motor case and the impeller, double mechanical seal elements surrounding said shaft and isolating said seal chamber from said motor case and from the region of said impeller, said motor case and said seal chamber being filled with a dielectric fluid, means communicating with said motor case for maintaining a predetermined pressure on the fluid therein, and a flexible partition having one side exposed to said seal chamber and its other side exposed to said motor case and adapted to compensate for change in volume of the fluid within said seal chamber.

11. In an electric motor driven pump structure wherein the electric motor is encased in a fluid-tight case and the motor shaft protrudes from said case for connection to a pump impeller, the combination of: a seal chamber interposed between the motor case and the impeller; a mechanical seal unit surrounding said shaft and isolating said seal chamber from said motor case and from the region of said impeller; at least said seal unit between said seal chamber and said motor case including a resilient cushion mounted in a wall of said seal chamber, a fixed sealing ring seated on said cushion, a rotating sealing ring mounted on said shaft, a yieldable sealing ring backing said rotating ring, and a spring urging said rotating ring into sealing engagement with said fixed ring, said rotating and fixed rings forming elements of a check valve capable of passing a fluid from said motor case into said seal chamber; and a flexible partition having one side exposed to fluid in said motor case and its other side exposed to fluid in said seal chamber, and adapted to compensate for change in the volume of fluid in said seal chamber.

12. In an electric motor driven pump structure wherein the electric motor is encased in a fluid-tight case and the motor shaft protrudes from said case for connection to a pump impeller, the combination of: a seal chamber interposed between the motor case and the impeller; a mechanical seal unit surrounding said shaft and isolating said seal chamber from said motor case and from the region of said impeller; at least said seal unit between said seal chamber and said motor case including a resilient cushion mounted in a wall of said seal chamber, a fixed sealing ring seated on said cushion, a rotating sealing ring mounted on said shaft, a yieldable sealing ring backing said rotating ring, and a spring urging said rotating ring into sealing engagement with said fixed ring, said sealing rings forming elements of a check valve capable of passing a fluid from said motor case into said seal chamber; a flexible partition having one side exposed to fluid in said motor case and its other side exposed to fluid in said seal chamber, and adapted to compensate for change in the volume of fluid in said seal chamber; and means for maintaining the fluid in said motor case above the pressure externally of said seal chamber in the region of said shaft.

13. In an electric motor driven pump structure wherein the electric motor is encased in a fluid-tight case and the motor shaft protrudes from said case for connection to a pump impeller, the combination of: a seal chamber interposed between the motor case and the impeller; mechanical seal units surrounding said shaft and isolating said seal chamber from said motor case and from the region of said impeller; at least one of said seal units between said seal chamber and said motor case including a resilient cushion mounted in a wall of said seal chamber, a fixed sealing ring seated on said cushion, a rotating sealing ring mounted on said shaft, a yieldable sealing ring backing said rotating ring, and a spring urging said rotating ring into sealing engagement with said fixed ring, said sealing rings forming elements of a check valve capable of passing a fluid from said motor case into said seal chamber; a flexible partition having one side exposed to a fluid in said motor case and its other side exposed to a fluid in said seal chamber, and adapted to compensate for change in the volume of fluid in said seal chamber; and means communicating with said motor case for maintaining a predetermined pressure on the fluid therein.

14. A construction as set forth in claim 8, wherein said seal elements include fixed and rotating seal rings having mating sealing faces, and yieldable means urging said sealing rings into sealing contact, at least one of said seal elements forming a check valve opening into said seal chamber.

15. In an electric motor driven pump structure wherein the electric motor is encased in a fluid-tight case and the motor shaft protrudes from said case for connection to a pump impeller, the combination of: a seal chamber interposed between the motor case and the impeller; a first mechanical seal unit for said shaft between said motor case and said seal chamber, a second mechanical seal unit for said shaft between said seal chamber and the region of said impeller; each seal unit including a fixed and a rotating seal member having mating sealing surfaces and yieldable means urging said sealing members into engagement, said sealing members forming a check valve opening into said seal chamber, the sealing members of said first seal unit having greater pressure areas effective to cause check valve operation than the sealing members of said second seal unit whereby said first seal unit opens at a lower pressure differential than said second seal unit; and a flexible partition having one side exposed to the interior of said motor case and its other side exposed to said seal chamber, and adapted to compensate for change in the volume of a liquid filling said seal chamber.

CARL J. BLOM.